Jan. 27, 1970   E. RISELEY   3,492,181
JOINTING OF THERMOPLASTIC YARN
Filed March 25, 1966   5 Sheets-Sheet 1

INVENTOR:
EDWIN RISELEY
BY
Breitenfeld & Levine
ATTORNEYS

INVENTOR:
EDWIN RISELEY
BY
Breitenfeld & Levine
ATTORNEYS

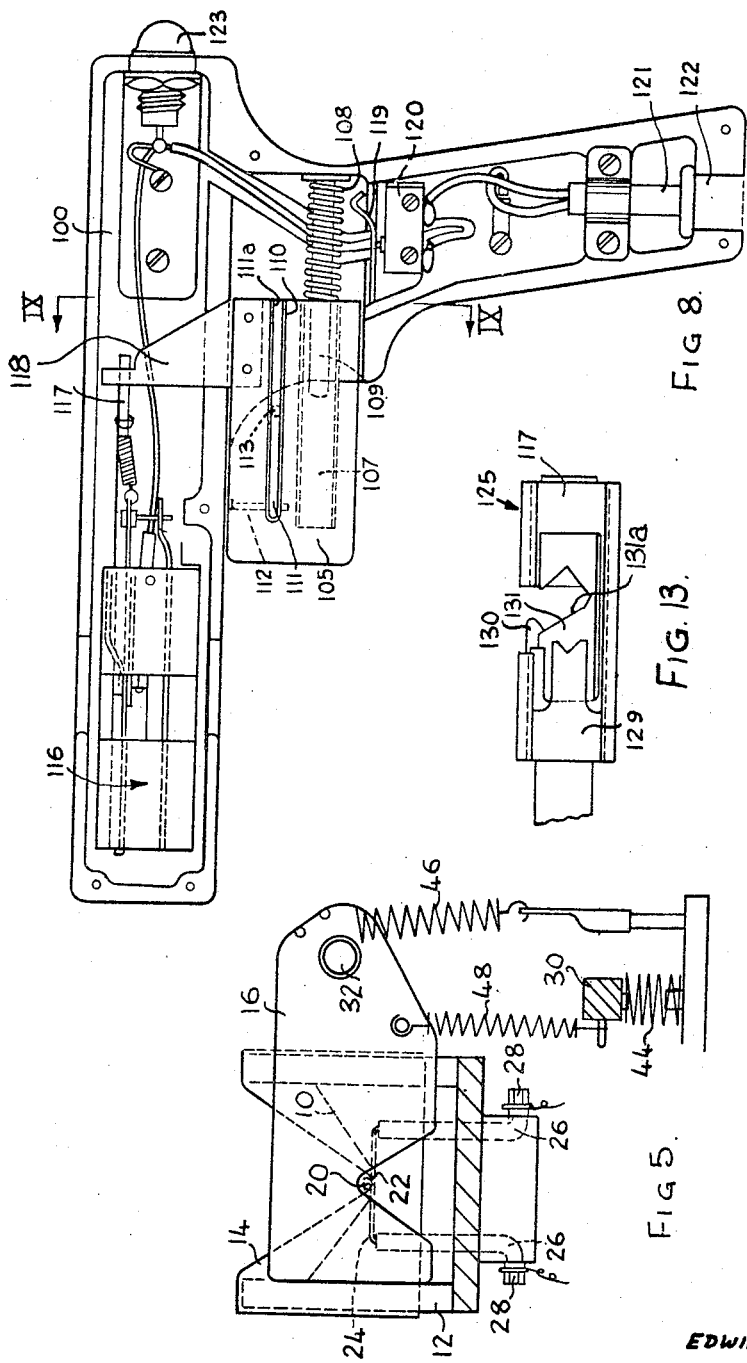

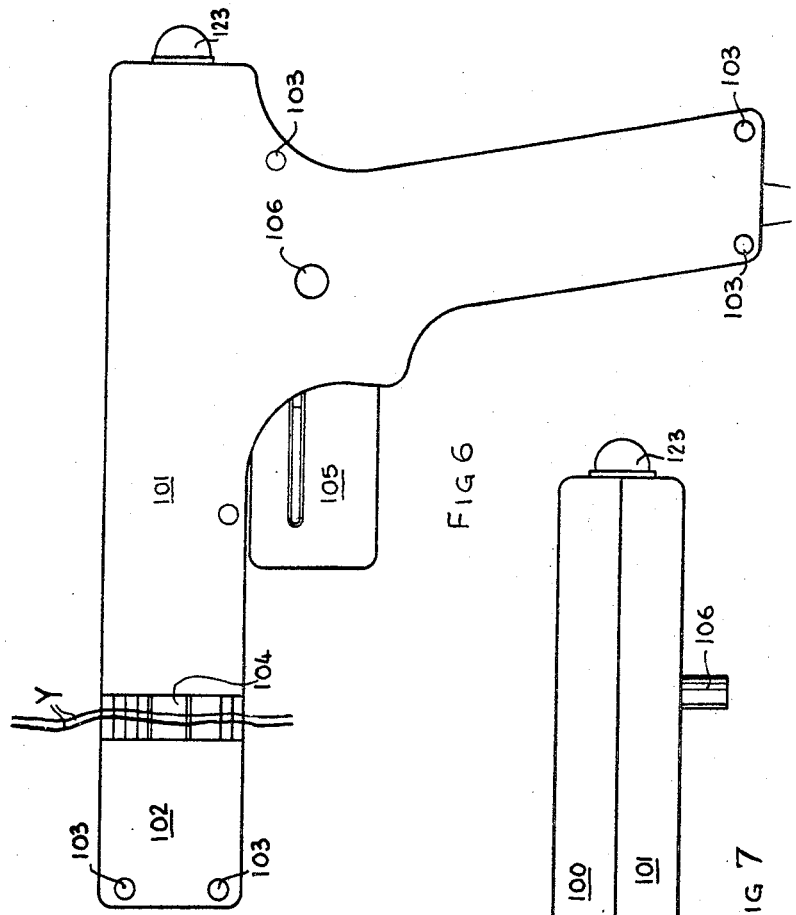

Jan. 27, 1970　　　　　E. RISELEY　　　　　3,492,181
JOINTING OF THERMOPLASTIC YARN
Filed March 25, 1966　　　　　　　　　　　5 Sheets-Sheet 5

INVENTOR:
EDWIN RISELEY
BY
Breitenfeld & Levine
ATTORNEYS

United States Patent Office 3,492,181
Patented Jan. 27, 1970

3,492,181
JOINTING OF THERMOPLASTIC YARN
Edwin Riseley, 12 Cambridge Ave.,
Macclesfield, England
Filed Mar. 25, 1966, Ser. No. 544,336
Int. Cl. B65h *19/28, 69/00, 69/08*
U.S. Cl. 156—158                                14 Claims

ABSTRACT OF THE DISCLOSURE

Relatively movable metallic jaws grip yarns to be jointed at a point spaced from the ends of the yarns. Heater, permanently spaced from the jaws melts yarn ends, and melted yarn material runs to jaws which extract the heat from it. Yarn material solidifies forming a fused joint between the yarn portions gripped by the jaws. Jaws have opposed V-shaped notches, the yarns being gripped between the apices thereof. Jaws may pivot or slide with respect to each other.

---

This invention concerns the jointing of thermoplastic yarn, that is to say the fusion together of two or more ends of such yarn by the application of heat.

The object of the invention is to enable the jointing of thermoplastic yarn to be carried out speedily, and to produce a joint having excellent characteristics.

According to one feature of the present invention a method of jointing thermoplastic yarns comprises the steps of holding the ends to be jointed closely side by side and extending co-extensively in the same direction, heating the adjacent ends so as to cause them to fuse, and taking away heat, at a point spaced from the heated region and where the ends are held together, all in such a manner that the ends are severed at the region where the heat is applied by fusion and the fused material runs back to the region where the ends are held and heat taken away to be there solidified and form a joint between the ends.

According to another feature of the invention there is provided apparatus for carrying out this method and including jaws for holding the yarn ends and taking away heat at an appropriate rate, and heating means spaced from said jaws. Preferably the jaws and heating means are relatively adjustable to enable the distance therebetween to be altered. The heating means may be an electric resistance wire.

The invention will be further apparent from the following description with reference to the several figures of the accompanying drawings, which show, by way of example only, two devices for use in practising the method of the invention.

Of the drawings:

FIGS. 4 and 5 are sectional and elevations, to an enlarged scale on the line X—X of FIG. 2 and showing the jaws open and closed respectively, certain parts being omitted for the sake of clarity;

FIG. 6 is a side elevation of a second device;

FIG. 7 is a top plan view of the second device;

FIG. 8 is a view corresponding with that of FIG. 6 but with the casing parts removed;

FIG. 13 is a top plan view of the complete assembly.

Figure 1:
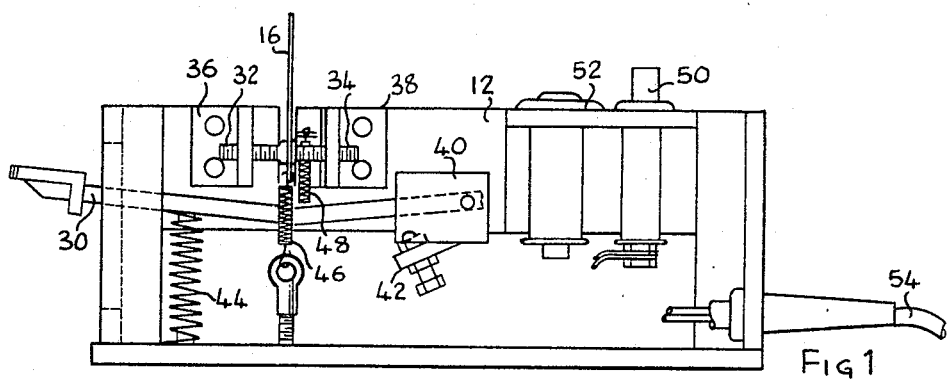
FIG. 1 is a front elevation of a first device.

Referring to FIGS 1–5 of the drawings it will be seen that the first device comprises essentially yarn support jaws for gripping the yarn ends, a heating element for heating the yarn ends and means for operating the jaws and heating element respectively.

Reference to the more obvious constructional parts of the device will be omitted in the following description.

The yarn support consists of a wooden V-block 10 carried in a metal channel 12.

For gripping the yarn two jaws 14, 16 are provided. The jaw 14 is fixed, being located in a transverse gap in the V-block 10 and channel 12; whilst the jaw 16 is movable, being mounted for pivotal movement about adjustor 18 the function of the latter being described hereinafter. The jaws have complementary V-formations; in their open position (FIG 4) access to the V-formation of the fixed jaw 14 is afforded, and in their closed position (FIG. 5) the V-formations serve to grip ends of yarn 20, 22 therebetween.

The heating element 24 is located adjacent the fixed jaw 14, in a space provided by setting back that part of the V-block 10 at the fixed jaw side of the yarn support. It consists of a suitable resistance wire which is led into and supported in position by means of ceramic insulators 26 and having terminals 28 for connection. Part of the element 24 extends horizontally parallel to the planes of the jaws 14, 16 at the level of the apex of the V-formation in the fixed jaw 14 so that yarn ends held by the jaws rest on the element.

A lever 30 is provided for operating the jaws 14, 16. When the end of the lever 30 is held depressed the jaws 14, 16 are closed, and when the lever 30 is released, the jaws open. This is made possible by suitable mounting of the jaws, and suitably connecting the lever 30 and the jaw 16. The mounting of the two jaws has already been referred to, and it is only necessary to describe the construction of the adjustor 18 in slightly more detail. This adjustor has three parts; two externally threaded studs 32, 34 carried in complementarily internally threaded holes in brackets 36, 38. The adjacent ends of the studs 32, 34 are hollow and accommodate the ends of a pin (not visible in the drawings) on which the jaw 16 is pivotally mounted.

The studs 32, 34 serve to locate the jaw 16 longitudinally of the device and relative to the fixed jaw 14, by adjusting them within the brackets 36, 38. The lever is pivotally mounted in a block 40 which incorporates an adjustable stop 42 whereby the extent of downward movement of the lever 30 can be controlled. A compression spring 44 extends between the free end of the lever 30 and a fixed part of the device to urge the lever upwardly. Two further springs serve to connect the lever, at or about its midpoint, to the jaw 16. Both are tension springs, the one 46 extending between the jaw 16 and a fixed part on the device in such a position as to urge the jaw 16 into its open position, and the other 48 extending between the jaw 16 and the lever 30 in such a position as to urge the jaw 16 into its closed position. The springs 44, 46, 48 are so designed that, on depression of the lever 30 the jaw 16 is swung into its closed position to hold yarn between it and the fixed jaw 14, but so that on continued depression of the lever 30 undue force is not exerted on the yarn ends whereby to damage them; and so that on release of the lever 30 the fixed jaw 16 moves rapidly to its open position and remains there.

For operating the heating element there is provided a button switch 50 with associated indicator light 52 which is energised when the supply to the element is on.

These parts are disposed in circuit between a main supply lead 54 and the element 24 whereby, so long as the button switch is held depressed, electric heating current is fed to the element.

Figure 2:
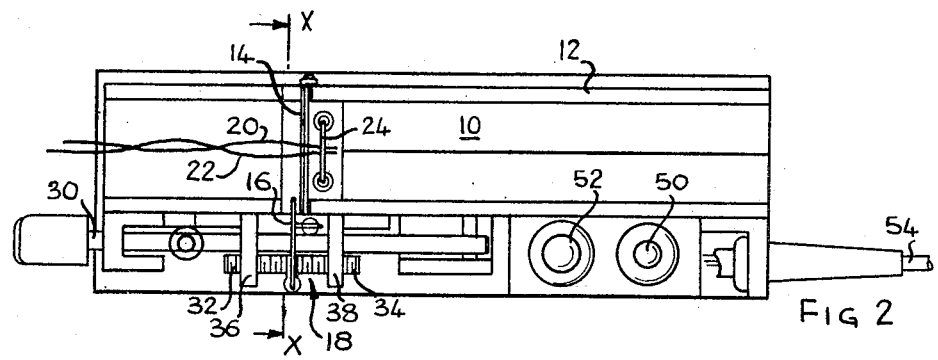
FIG. 2 is a plan view corresponding to FIG. 1.
Figure 4:
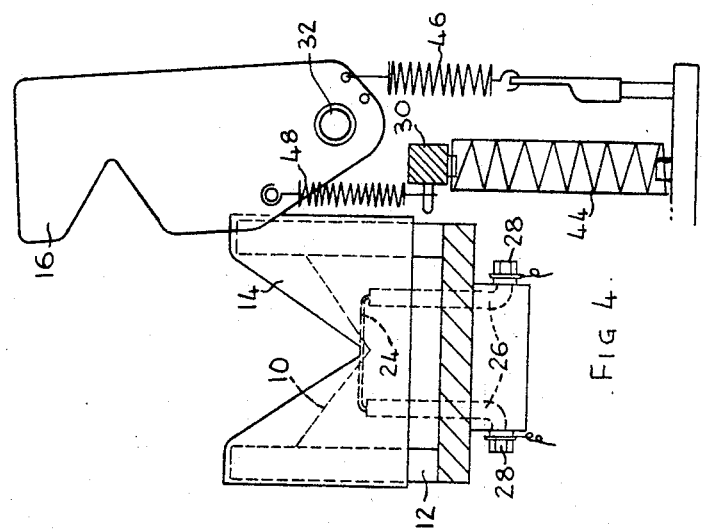
Figure 3:
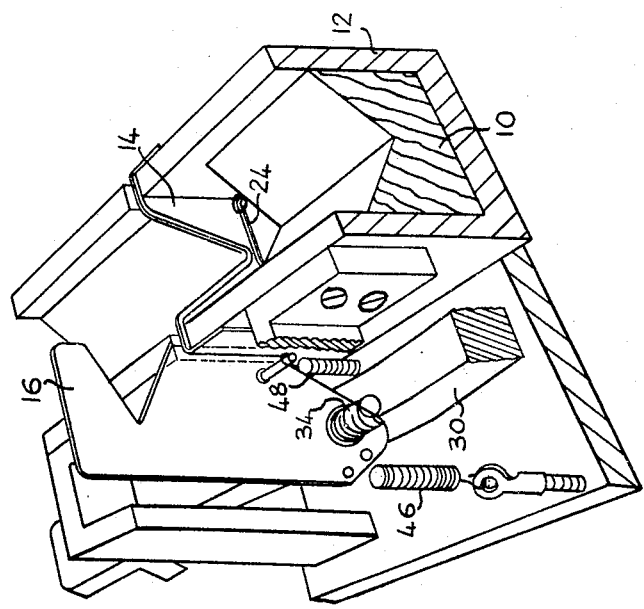
FIG. 3 is a sectional perspective view of the device shown in FIGS 1 and 2.

In operation, yarn ends 20, 22 are laid side-by-side in the V-block 10, the jaws of course being open, their extremities extending across the horizontal part of the element 24 (FIG. 2). The lever is then held depressed so that the jaw 16 pivots to the closed position to grip the yarn ends lightly in position (FIG. 5). The button switch is then depressed so that the element 24 heats up and rapidly fuses and severs the yarn ends. Fused yarn runs back to the jaws 14, 16 which act as a "heat sink" and rapidly cool the fused yarn material as it approaches them to form a joint between the ends. On fusion the button switch 50 is released to de-energise the element 24, and immediately on formation of the joint the lever 30 is released so that the jaws open, whereupon the joined yarn ends may be removed from the device.

The second embodiment will now be described with reference to FIGS. 6–12.

As best seen from FIGS. 6 and 7 the device has an outer casing in the form of a pistol, and is adapted to be held manually for use. The casing is comprised by a part 100 forming one side thereof and by parts 101 and 102 secured to the part 100 by screws 103 and forming the other side thereof. A space between the parts 101 and 102 defines a slot 104 whereby a pair of yarns Y to be joined may be laid in side-by-side relationship so as to extend transversely through the interior of the barrel portion of the casing. A trigger member 105 is provided which may be pulled inwardly to actuate the device. When the trigger 105 is pulled inwardly it assumes a latched position from which is may be released by a release button 106 which protrudes outwardly from the casing part 101.

Figure 9:
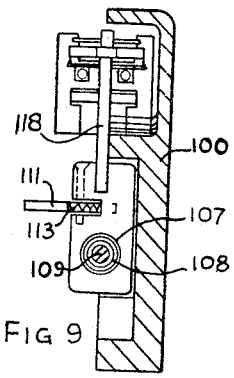
FIG. 9 is a section of the device seen on line IX—IX of FIG. 8.
Figure 10:
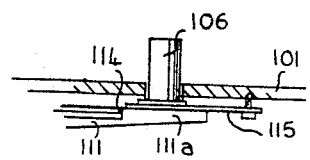
FIG. 10 is a fragmentary section showing the operation of the trigger release mechanism.

As best seen from FIGS. 8 and 9, the trigger member 105, which is comprised by a moulded block, has a bore 107 extending thereinto from its rear face. A compression spring 108 is located in the bore 107 and extends rearwardly therefrom to abut the interior wall of the casing, the rear portion thereof being located over a stud 109 which extends partially into the bore 107 when the trigger is in its released position (as seen in FIG. 8). A groove 110 is provided in the side face of the trigger remote from the casing part 100 in which groove is located a lever 111 pivoted on a pin 112 adjacent its forward end and urged outwardly by a small compression spring 113 located in a blind bore in the member 105.

The rear end of the lever 111 has a head 111a, which engages on a step 114 defined on the interior wall of the casing part 101 to latch the trigger in its inward position when pulled rearwardly against the action of the spring 108. The button 106 bears against a leaf spring 115 which serves to lift the head 111a from the step 114 (see FIG. 10) when the button 106 is pressed, thereby enabling the spring 108 to return the trigger 105 to its outer position.

A sub-assembly, generally indicated at 116 is located at the forward end of the barrel portion of the casing. This sub-assembly 116 will be described in greater detail hereinafter, but suffice it to say, at this time that it includes an operating slide 117 which extends rearwardly therefrom. The slide 117 has a notch 117a at its rear end which is engaged by a part 118 secured to the trigger 105 and extending upwardly therefrom.

When the trigger 105 is pulled inwardly its action is twofold. In the first place the part 118 cooperates with the slide 117 to draw the latter rearwardly, and in the second place the lower face of the trigger 105 engages a leaf spring 119 to effect closure of a micro-switch 120, as the trigger is pulled past its latched position.

An electric supply cable 121 enters the casing through a grommet 112 at the base of the handle or pistol grip portion of the casing. The supply cable 121 has two leads, one of which is connected to the casing, which is formed from a conducting metal, and the other of which is connected to one terminal of the micro-switch 120. The other terminal of the micro-switch 120 supplies a warning lamp 123 at the rear of the casing, and an electrical resistance heater 124 included in the sub-assembly 116. It follows that when the trigger 105 is in its innermost position, the lamp 123 is illuminated, and the resistance heater 124 is energised.

Figure 11:
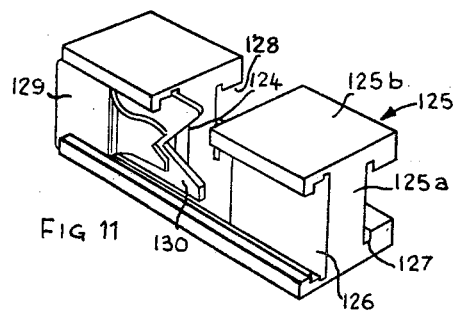
FIG. 11 is a perspective view of the fixed part of the sub-assembly of the device.
Figure 12:
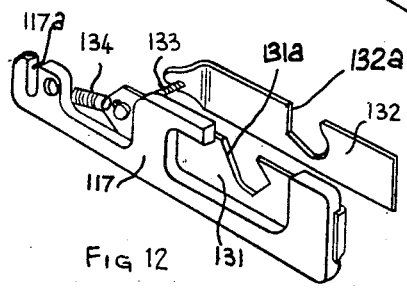
FIG. 12 is a perspective view of the movable parts of the sub-assembly of the device.

The sub-assembly 116 will now be described with reference to FIGS. 11 and 12.

The sub-assembly 116 includes a body 125 of generally H-section defining slideways 126 and 127 on opposite sides of the central web 125a thereof. A central portion of one of the side flanges 125b and the central web 125a of the body 125 is missing to form a channel 128 which is disposed in register with the slot 104 so that yarn ends introduced into the casing through the slot 104 lie transversely within the channel 128.

Two strips 129 and 130 having portions provided with V-notches forming jaws are supported by the body 125 so as to lie in spaced relation one on either side of the slideway 126. The V-notches are in superimposed relationship and disposed over the section of the channel 128 at the top rear side thereof.

The operating slide 117 is adapted to reciprocate in the slideway 126 together with a strip 131 which is juxtaposed with same. A strip 132 is provided and adapted to reciprocate in the slideway 127, and the strips 131 and 132 are connected by a pin 133 extending transversely therebetween rearwardly of the block 125.

A small tension spring 134 extends between the rear end of the strip 131 and the slide 117, but rearward movement of the strips 131 and 132 relative to the slide 117 is limited by the forward end of the strip 131 which is turned over the end of the slide 117.

The strips 131 and 132 have notches 131a and 132a in which the yarns may be laid and that portion of the slide 117 which would otherwise prevent laying of yarn through the channel 128 is cut away.

In operation the strip 131 slides between the strips 129 and 130 and the forward part of the notch 131a is profiled with a V-formation forming a jaw which cooperates with the V-notched jaws of the strips 129 and 130 to grip yarn ends therebetween.

The resistance heater 124 is disposed in slightly spaced relationship parallel to the plane of the strips 129 and 130 below the strips 129 and 130 and is positioned slightly forwardly of the apices of the V-notches thereof.

In use, yarn ends to be joined are laid in side-by-side relationship through the slot 104 in such a manner that they extend, co-extensively in the same direction. The ends are disposed so that those portions thereof which are to lie on opposite sides of the joint to be formed extend outwardly from the upper end of the slot 104 in the barrel portion of the casing. The trigger 105 is then pulled inwardly causing the strips 131 and 132 to move rearwardly to carry the yarn ends rearwardly whereby they are gripped in the jaws constituted by the notches of the strips 128, 129 and 131, their lower portions being laid over the heater 124. The jaws are held closed by the spring 134 which permits excess movement of the slide 117 relative to the strips 131 and 132. When the trigger 105 passes its latched position the heater 124 is energised causing the yarn ends to fuse and sever. Fused yarn runs back to the jaws comprised by the strips 130 and 131 which act as a "heat sink" to cool rapidly the fused yarn material as it approaches them to form a joint between the ends. After fusion, the trigger is released to the latched position at which stage the element and pilot light are switched off, but the yarn is still gripped by the V-jaws, the formed welded joint is allowed to cool, this requires a period of 2–3 seconds after which the release button 106 is depressed to release the trigger which moves forwardly under the action of the spring 108 thereby opening the jaws whereupon the jointed yarn ends may be removed from the device.

The relative dimensions of the various parts of both devices have not been described in detail as a competent engineer would have no difficulty, perhaps after a little experimentation, in selecting them appropriately, having regard to the nature of the ends to be jointed. In this latter connection, although the term yarn has been used throughout this specification, it is to be understood that any thermoplastic materials of a filamentary nature may be jointed by the method according to the invention and by a suitably designed device according to the invention. The invention is particularly applicable to the jointing of heavy denier yarns such as carpet yarns, where knotting is unacceptable. It has been found possible to form an excellent joint between ends of 1050 denier nylon yarn in approximately 12 seconds. Close examination of the joint revealed that, whilst its strength was perfectly adequate the cross-sectional area at the joint was slightly less than the average cross-sectional area of the yarn guides. Also, perhaps surprisingly, the yarn ends were easily aligned and remained well aligned after formation of the joint and on removal from the device.

As indicated the devices which have been described witr reference to the accompanying drawings represent only two possible embodiments. Clearly many modifications are possible within the scope of the invention.

It is however important to provide means for heating the yarn rapidly to fusion, to correctly select the distance between the heating element and the jaws, and to facilitate rapid opening of the jaws after forming the joint.

What I claim is:

1. A method of jointing thermoplastic yarns, comprising the steps of arranging the yarns to be joined in side-by-side relation and so that they extend in the same direction, gripping the yarns between metallic jaws at a point spaced from the ends of the yarns, heating the ends of the yarns at a point spaced from the jaws so as to cause the yarn ends to melt, and removing the heat, whereby the melted yarn material runs to and engages the jaws and the yarn portions gripped therebetween, and the metallic jaws extract heat from the melted material causing it to solidify and form a fused joint between the yarns gripped by the jaws.

2. Apparatus for jointing thermoplastic yarns, comprising means for supporting the yarns extending in the same direction in side-by-side relation, metallic jaw means for gripping the yarns, and heating means permanently spaced from said jaw means for melting the yarn, whereby when yarns are gripped by said jaws at a point spaced from their ends and the yarn ends are melted by said heating means, the melted yarn material runs to the jaws which extract the heat therefrom causing the material to solidify and form a fused joint between the yarns gripped by said jaws.

3. Apparatus according to claim 2 wherein said heating means comprises an electric resistance heater.

4. Apparatus according to claim 2 wherein said jaw means are comprised by plates having V-shaped notches which are relatively moveable and co-operate to trap the yarn ends between the apices of the notches.

5. Apparatus according to claim 4 wherein said means for operating said jaw means operates on one jaw through the medium of at least one tension spring whereby the force with which the ends are gripped is controlled and predetermined.

6. Apparatus according to claim 5 wherein said means for operating said jaw means includes spring means whereby when one jaw is released from its yarn gripping position it separates from the other jaw rapidly.

7. Apparatus according to claim 6 wherein one of said jaws is adapted to pivot relative to the other.

8. Apparatus according to claim 6 wherein one of said jaws is adapted to slide longitudinally relative to the other.

9. Apparatus according to claim 8 including an outer casing in the form of a pistol, having a slot in the barrel portion thereof through which yarn ends to be joined may be introduced to lie betwene said jaw means.

10. Apparatus according to claim 9 wherein said casing has a trigger member protruding therefrom which may be actuated to operate said jaw means and said heater.

11. Apparatus according to claim 10 wherein said trigger includes means to latch same in its operative position with the jaws closed and means for releasing the trigger from its latched position to return to its inoperative position under the action of spring means.

12. Apparatus according to claim 11 wherein said trigger carries a member which engages a slide to move the latter with the trigger, one of said jaws being connected to said slide by tension spring means permitting excess movement of the slide relative thereto after the jaw means attains a position wherein its further movement is prevented by yarn ends between same and the other jaw means.

13. Apparatus according to claim 10 wherein said one of said jaws is slidable between two plates having V-notches in substantially superimposed relationship and constituting the other jaw means.

14. Apparatus according to claim 13 wherein said heater is comprised by an electrical resistance wire adapted to be energised by a switch which is adapted to be closed by said trigger when in its operative position.

References Cited

UNITED STATES PATENTS

| 2,863,492 | 12/1958 | Chang et al. | 156—158 |
| 3,055,786 | 9/1962 | Hendrix | 156—158 |
| 3,160,547 | 12/1964 | Williams | 156—433 |
| 3,301,735 | 1/1967 | Williams | 156—433 |

HAROLD ANSHER, Primary Examiner

JOSEPH C. GIL, Assistant Examiner

U.S. Cl. X.R.

57—23, 159; 156—304, 306, 433, 502